Patented July 29, 1941

2,250,485

UNITED STATES PATENT OFFICE 2,250,485

PROCESS FOR POLYMERIZING ACRYLIC AND METHACRYLIC ACID ESTERS

Carl T. Kautter, Darmstadt, Germany, assignor to Röhm & Haas Company, Philadelphia, Pa.

No Drawing. Application August 12, 1939, Serial No. 289,776. In Germany August 16, 1938

5 Claims. (Cl. 260—83)

This invention relates to a method for polymerizing compounds of the acrylic and methacrylic acid series. It relates more particularly to a method of polymerizing such materials in finely divided form under conditions which cause very rapid polymerization.

It is known that acrylic acid, its homologs and functional derivatives can be polymerized while in a finely divided state, for example when emulsified in water. In such cases the catalyst employed has often been dissolved in the material to be polymerized but the more general practice is to dissolve the catalyst, which is usually an organic peroxide, in the dispersing medium.

It has now been found that valuable polymerization products can be obtained by dissolving the catalyst in an acrylic compound and then continuously spraying the solution in the form of a very fine mist or extruding in the form of a fiber into hot gases, thus causing polymerization to take place within a very few seconds. It is desirable to prepolymerize the starting material by known methods to the point where it still retains sufficient fluidity to be easily sprayed.

In many cases it is advantageous to subject the polymers made according to this invention to a heat treatment at high temperatures.

Air or other sufficiently inert gas such as nitrogen, hydrogen etc. may be used. The air and the finely divided liquid may be passed through a suitable apparatus countercurrently or concurrently. It is also desirable to circulate the gas, passing it through a filter to remove the finely divided polymer.

In order to obtain the material to be polymerized in a finely divided form it may be forced through a spinneret such as is commonly used in the artificial silk industry, in which case the polymer is obtained in the form of fine threads or fibers. It may also be obtained in the form of a fine powder or as batting by flowing a stream of the monomeric acrylic compound on a rapidly rotating disc.

The invention may be illustrated by the following examples but it is not limited to the temperatures, materials, etc. shown as it may be otherwise practiced within the scope of the appended claims.

Example 1

Methyl methacrylate containing 0.25% of benzoyl peroxide is polymerized in a suitable apparatus until it has a refractive index of about 1.432. An additional 0.2% of benzoyl peroxide is then dissolved in the prepolymerized material. By means of a suitable apparatus the prepolymerized material is then flowed in a fine stream at about 40° C. on a horizontally disposed, rotating, metal disc which is arranged within a reaction chamber. This chamber is maintained at a temperature of about 120° C. by means of a current of hot air which is moving at the rate of one to two meters per second. The finely divided ester polymerizes instantaneously. The polymer drops to the floor of the chamber from which it can be removed by any convenient means. The air passes through a filter and a cyclone separator, thence through a heating zone and back to the reaction chamber. The polymer thus obtained may be used for the preparation of molding material or dissolved in a solvent.

Example 2

A mixture containing 90% of methyl methacrylate and 10% of butyl acrylate is prepolymerized as described in Example 1. It is then forced through a spinneret into a reaction tube several meters long. A stream of hot air passes downward through the tube in the same direction as the material being polymerized. The polymer is obtained as a mass of fine threads which may be employed as a textile or insulating material.

In place of the polymerizable mixture given, one containing 91% of methyl methacrylate, 7% of methyl acrylate and 2% of dibutyl phthalate may be used with good results.

I claim:

1. The process of polymerizing a material selected from the group consisting of low alkyl-esters of acrylic and methacrylic acids and mixtures thereof which comprises passing the polymerizable compound containing a catalyst, in a finely divided condition into an inert gas heated to a temperature high enough to cause polymerization to take place within a few seconds.

2. The process of polymerizing a material selected from the group consisting of low alkyl esters of acrylic and methacrylic acids and mixtures thereof which comprises passing the polymerizable compound containing a catalyst in the form of a fine mist into an inert gas at a temperature of about 120° C.

3. The process of polymerizing a material selected from the group consisting of low alkyl esters of acrylic and methacrylic acids and mixtures thereof which comprises passing the polymerizable compound containing a catalyst in the form of fine threads into an inert gas at a temperature of about 120° C.

4. The process of polymerizing methyl methacrylate which comprises dissolving a catalyst therein and passing it in the form of a fine mist into an inert gas at a temperature of about 120° C.

5. The process of polymerizing methyl methacrylate which comprises dissolving a catalyst therein and passing it in the form of fine threads into an inert gas at a temperature of about 120° C.

CARL T. KAUTTER.